(12) United States Patent
Shkolnikov et al.

(10) Patent No.: US 8,370,106 B2
(45) Date of Patent: Feb. 5, 2013

(54) SPATIALLY AWARE INFERENCE LOGIC

(75) Inventors: Mark Shkolnikov, Herndon, VA (US); Yevgeniy Shkolnikov, Furlong, PA (US)

(73) Assignee: Keynetik, Inc., Herndon, VA (US)

( * ) Notice: Subject to any disclaimer, the term of this patent is extended or adjusted under 35 U.S.C. 154(b) by 824 days.

(21) Appl. No.: 12/498,111

(22) Filed: Jul. 6, 2009

(65) Prior Publication Data

US 2010/0001949 A1   Jan. 7, 2010

Related U.S. Application Data

(60) Provisional application No. 61/078,638, filed on Jul. 7, 2008, provisional application No. 61/113,738, filed on Nov. 12, 2008.

(51) Int. Cl.
*G01C 9/00* (2006.01)
*G01C 17/00* (2006.01)
*G01C 19/00* (2006.01)

(52) U.S. Cl. .................................. 702/153; 702/150

(58) Field of Classification Search ............. 702/92, 702/94, 145, 150, 151, 152, 153, 155; 700/302
See application file for complete search history.

(56) References Cited

U.S. PATENT DOCUMENTS

| 7,280,096 B2* | 10/2007 | Marvit et al. ............ 345/156 |
| 2005/0219213 A1 | 10/2005 | Cho et al. |
| 2006/0202997 A1* | 9/2006 | LaValley et al. .......... 345/473 |
| 2007/0146323 A1 | 6/2007 | Nishikata et al. |
| 2007/0211025 A1* | 9/2007 | Sato ......................... 345/158 |
| 2008/0192005 A1* | 8/2008 | Elgoyhen et al. ......... 345/158 |
| 2008/0228429 A1* | 9/2008 | Huang et al. ............. 702/141 |
| 2009/0099812 A1* | 4/2009 | Kahn et al. .............. 702/152 |

FOREIGN PATENT DOCUMENTS

JP   2002169645   6/2002

* cited by examiner

*Primary Examiner* — Michael Nghiem
*Assistant Examiner* — Yaritza H Perez Bermudez
(74) *Attorney, Agent, or Firm* — Lieberman & Brandsdorfer, LLC

(57) ABSTRACT

A method, system, and article to support a motion based input system. Movement data is acquired from a motion sensor. An orientation detector detects orientation towards gravity from a rest position, and a motion detector detects motion, including movement and rest. In addition, an inference state machine in communication with the orientation and motion detectors maintains a sequence of the detected motion conditions, and produces a profile description for the sequence of the detected motion conditions. An output event corresponding to the profile description is generated based upon the profile.

20 Claims, 9 Drawing Sheets

SPATIALLY AWARE INFERENCE LOGIC

CROSS REFERENCE TO RELATED APPLICATION(S)

The present application is a non-provisional utility patent application claiming the benefit of U.S. Provisional Patent Application Ser. No. 61/078,638, filed on Jul. 7, 2008 and titled "Spatially Aware Inference Logic for Devices with Motion Sensors," now pending, and U.S. Provisional Patent Application Ser. No. 61/113,738, filed on Nov. 12, 2008 and titled "System for Motion Signal Processing with Inferential Signal Interpolation", both of which are hereby incorporated by reference.

BACKGROUND OF THE INVENTION

1. Technical Field

This invention relates to a motion based input component to classify disparate sequential data sets. More specifically, inference logic is employed to utilize gravitational reference to classify the data sets and to identify and bind the data sets to external data.

2. Description of the Prior Art

It is known in the art to employ one inertial motion sensor such as an accelerometer in a portable computing device to support various motion sensor functions for the portable device. The sensor measures linear accelerations in up to three orthogonal dimensions. A continuous stream of analog or digitized data from the motion sensor is processed to build a trajectory and/or signature of the motion, and to compare the signature to patterns of motion. However, data from a single inertial motion sensor has limitations. One of the drawbacks includes the inability to ascertain when a change of motion data is caused by uniform accelerated lateral motion or uniform rotation. Another drawback is the inability for the single inertial sensor to differentiate the force of gravity from inertia.

Even with the limitations of the single inertial sensor, the prior art systems employ signal processing with mathematical processing to sense and predict movement of the device, also known as gesture recognition. However, with the physical limitations of the sensor, the mathematical process is complex and utilizes computing power, which adds to the drainage of power from the battery of the device.

Accordingly, there is a need for a motion based system which utilizes gravitational reference to classify disparate sequential data sets from one or more inertial motion sensors. Such a system may also employ inference logic to bind the data sets with external data for identification purposes.

SUMMARY OF THE INVENTION

This invention comprises a system, method, and article for processing motion.

In one aspect of the invention, a motion based input system is provided. The system includes a processor in communication with memory, and a motion sensor in communication with the processor. The processor is employed to acquire movement data from the motion sensor and to control motion and orientation detectors. More specifically, a set of detectors is provided and configured to execute on the processor to detect a motion condition. There are different motion conditions that can be detected, including detecting orientation towards gravity from a rest position, and detecting motion such as movement and rest. A manager is provided in communication with the detectors, with the manager functioning to control the detectors. In addition, a tool in the form of an inference state machine maintains a sequence of the detected motion conditions, produces a profile description for the sequence of the detected motion, and outputs an event corresponding to the profile description.

In another aspect of the invention, a method is provided for processing motion data. More specifically, data is acquired from an inertial motion sensor of a host device, and classification of sequential motion data sets from the acquired data. The classified motion data sets are bound with external data from the host device. A profile of motion disambiguated by employment of the external data is produced, together with an output event corresponding to the profile.

In yet another aspect of the invention, an article is provided with a computer-readable carrier including computer program instructions configured process motion data. A processor is provided in communication with memory, and a motion sensor is provided in communication with the processor, with the processor acquiring movement data from the motion sensor. The computer readable carrier is provided with computer program instructions configured to detect both a motion condition and an orientation condition. More specifically, instructions are provided to detect orientation towards gravity from a rest position, to detect motion, including movement and rest, to maintain a sequence of the detected motion conditions, to produce a profile description for the sequence of the detected motion, and to output an event corresponding to the profile description.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
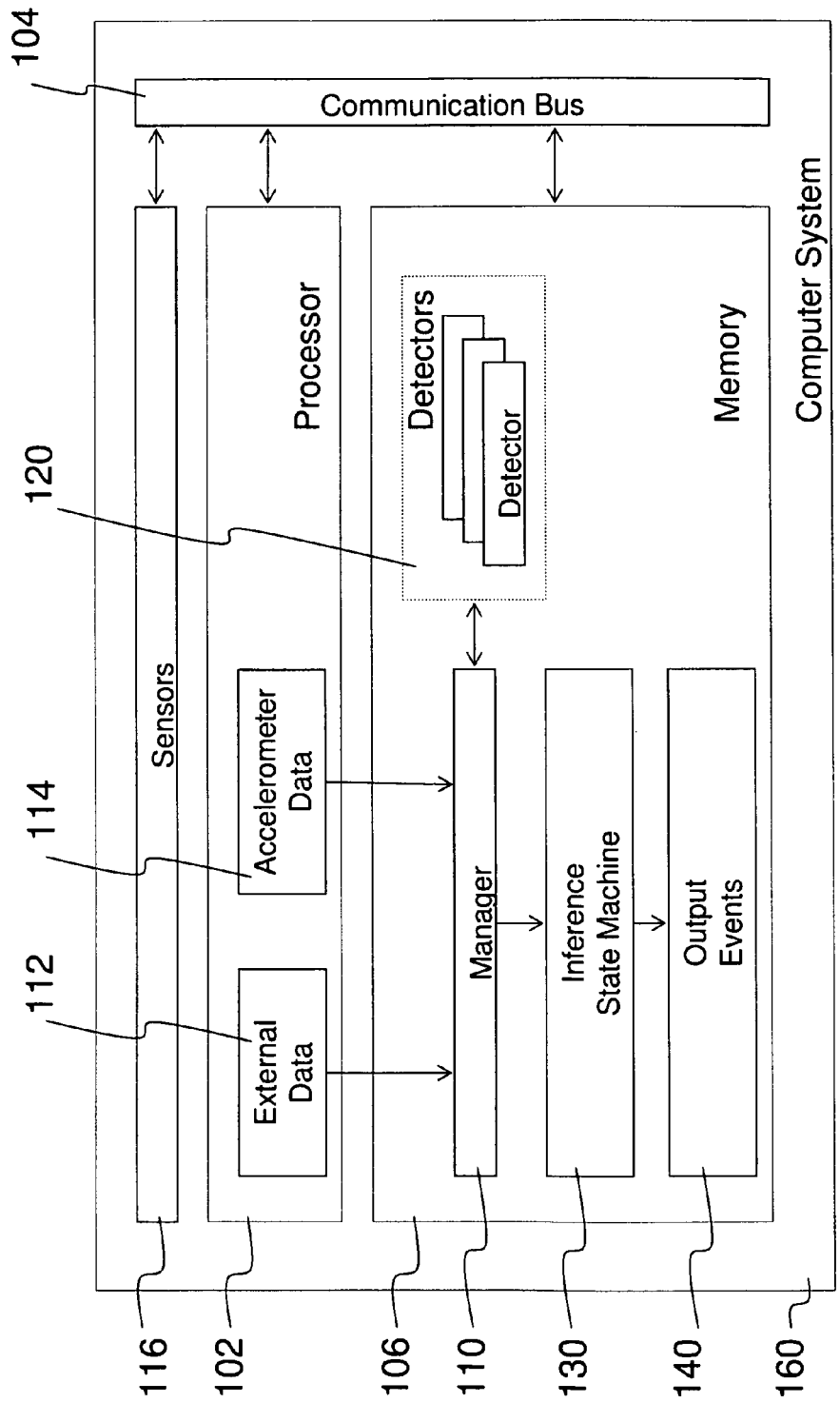
FIG. 1 is a block diagram of a system architecture showing a minimum quantity of components to support the motion based input system to output an event corresponding to a profile description, according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as detector(s), a manager, and an inference state machine. A manager, an inference state machine and/or detector(s) may be implemented in programmable hardware devices such as field programmable gate arrays, programmable array logic, programmable logic devices, or the like. The functional units may also be implemented in software for execution by various types of processors. An identified manager, inference state machine and detector(s) of executable code may, for instance, comprise one or more physical or logical blocks of computer instructions which may, for instance, be organized as an object, procedure, function, or other construct. Nevertheless, the executables of the functional units need not be physically located together, but may comprise disparate instructions stored in different locations which, when joined logically together, comprise the manager, inference state machine and detector(s) and achieve the stated purpose of the functional units.

Indeed, the executable code of the functional units could be a single instruction, or many instructions, and may even be distributed over several different code segments, among different applications, and across several memory devices. Similarly, operational data may be identified and illustrated herein within the manager and/or detector, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, detectors, logic, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

A motion processing component capable of classifying motion data sets from a tri-axis inertial motion sensor is provided for a mobile device. The motion data sets are acquired and then identified from a set of available commands. More specifically, an interface to a device is configured to provide an output event corresponding to a profile from acquired motion sensor data, which addresses issues pertaining to motion and orientation of the device. More specifically, one or more detectors provide motion detection, including detecting orientation of the device from a rest position towards gravity, and detecting motion of the device, including both movement and rest. Interworking of the detectors is controlled by a manager, which can start and stop individual detectors and can poll external data sources. Inference logic maintains a profile description for one or more detected conditions, and creates an output event corresponding to a profile for the acquired data.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

FIG. 1 is a block diagram (100) of the system architecture showing a minimum quantity of components to support the motion based input system to output an event corresponding to a profile description. More specifically, a computer system (160), herein referred to as a system, is provided with a processing unit (102) in communication with memory (106) across a bus (104). Although only one processing unit (102) is shown herein, in one embodiment, the system may be expanded to include multiple processing units. A manager (110) is provided local to memory (106) and in communication with the processing unit (102). The manager (110) functions to control motion detection components. More specifically, the manager (110) receives data from multiple sources, including external data (112) received from one or more client applications, the operating system and one or more non-motion sensors, and accelerometer data (114) received from one or more inertial motion sensors (116). The manager (110) communicates the received data to an application detector (120), hereinafter referred to as a detector, for processing, and once processed, the manager (110) communicates the processed data to an inference state machine (130). More specifically, the detector (120) processes the data received from the manager (110) and upon completion of the processing returns the processed data to the manager (110). Once the data is received from the detector (120), the manager (110) forwards the processed data to the inference state machine (130). The inference state machine (130) maintains a sequence of the detected motion conditions and produces a profile description for the detected motion. Based upon matching the profile description, the inference state machine (130) communicates an event (140) that corresponds to the profile description.

As noted above, the inference state machine (130) is employed to store motion conditions, acquire and bind external data with those conditions, produce motion profile and identify the profile with an output event. In one embodiment, the detector (120) is provided local to the system (160) to support local processing of local data. However, in another embodiment, the detector (120) may be remote from the system (160) so that the processing does not utilize resources of the system (160). Similarly, the manager (110) and the inference state machine (130) are shown as software tools local to or in communication with memory (106). However, in one embodiment, the manager (110) and/or the inference state machine (130) may be hardware tools embedded within the system (160) and external to memory (106) to support the functionality of the motion based input system. Accordingly, the manager (110) and inference state machine (130) herein may be configured as software tools, hardware tools, or a combination thereof.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Prior to explaining how the motion detector functions with the inference state machine, the motion condition that are to be assessed are defined. In one embodiment, the inertial sensor employed is a tri-axis accelerometer, which acquires data over the x-axis, y-axis, and z-axis. Based upon the sensor data, an orientation condition refers to sustained values of the x, y, and z, sensor data within certain limits over a predefined length of time. Similarly, a fast motion condition pertains to a certain change of the values of x, y, and z, sensor data, or a combination of x, y, and z sensor data, within a predefined length of time. Examples of fast motion condition include, but are not limited to, predominant movement in the Z direction, such as a push and/or pull condition, a predominant intense movement in the x or y direction(s), such as a shake condition, a predominant non-intense movement in the x or y direction(s) such as a tilt condition, and a predominant movement in the x or y direction and the z direction, such as a rotational condition.

There is a plurality of embodiments that may be employed with a motion detection algorithm. In one embodiment, a stream of motion data is processed through a function, and a condition is detected when the sum of motion vector amplitudes within the function exceeds a threshold. In one embodiment, motion data is normalized by gravity, with the following formula:

$$(\mathrm{sum}(|A_i|:|A_{i+w-1}|)/w - G)/G > Tm$$

where $|A|$=square root $(X^2+Y^2+Z^2)$, X, Y, and Z are acceleration components measured along x, y, and z axis, respectively, $A_i$ is a first sample in the window, i is a number of a sample, w is a number of readings in the window, $A_{i+w-1}$ is the last sample in the window, G is magnitude of the gravity, and Tm is a threshold. Complementary to the motion detection algorithm, an orientation algorithm may be implemented as a comparison of x, y, and z components of the vector to determine which side of the device is up, a straight forward recording and storing x, y, and z values, computing direction cosines towards gravity, etc.

Figure 2:
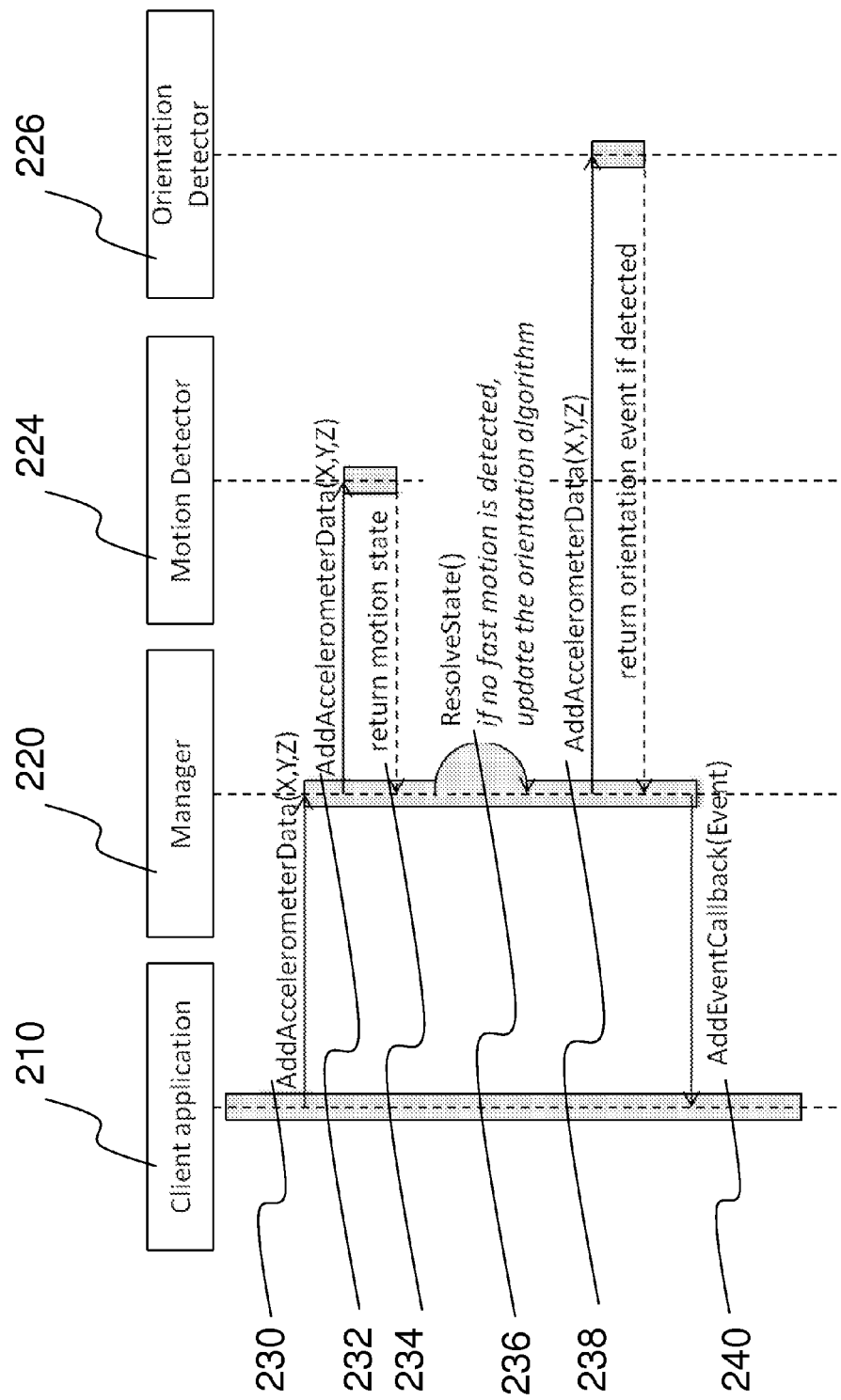
FIG. 2 is a state diagram illustrating the interworking of the motion detector with a client application.

FIG. 2 is a state diagram (200) illustrating the inter-working of the detectors with a client application. More specifically, the state diagram (200) shows a client application (210) in communication with a manager (220), which is further parsed to show a motion detector (224) and an orientation detector (226). Initially, the manager (220) receives motion data and/or external data (230) from a client application (210), and communicates the received motion data (232) to the motion detector (224) for processing. The motion detector (224) processes the received data and returns motion state data (234) to the manager (220). If the motion detector (224) does not detect fast motion (236), the manager is sending the motion data (238) to the orientation detector (226). Similarly, if a fast motion is detected (240), the motion data is not communicated (and therefore not shown) to the orientation detector (226) for processing. In one embodiment, the manager (220) can communicate an output event (240) to the client application if such an event is programmed in the inference state machine (not shown).

Figure 3:
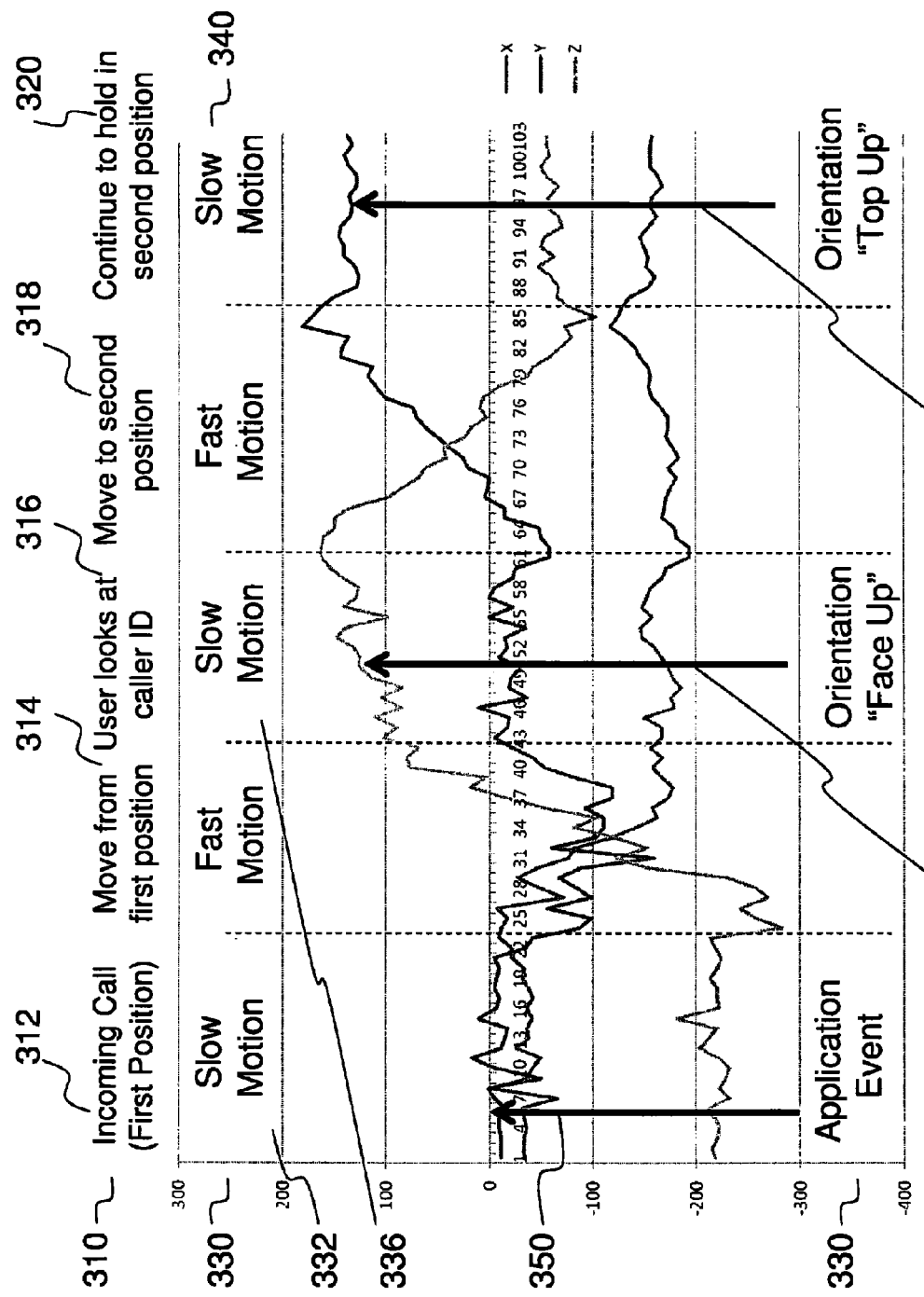
FIG. 3 is a block diagram illustrating a mapping of the motion data with motion conditions.

FIG. 3 is a block diagram (300) illustrating a mapping of the motion data with motion conditions. More specifically, the mapping shown in this figure pertains to a handheld portable device in the form of a mobile telephone, or a personal digital assistant that supports telecommunication. As shown at (310), there are five states reflected in the process of answering an incoming call and/or message, including client application event/notification of an incoming call or message (312), a user moving the handheld from it's prior position (314), a user looking at a visual display of the handheld (316), a user moving the handheld to a second position to response to the received call or message (318), and a user continuing to hold the handheld in the second position (320). Similarly, as shown at (330) that are motion states the reflect each of the five states reflected at (310). More specifically, an application event receipt (312), looking at the visual display, and retaining the handheld in the second position are each considered to be slow motion states (332), (336), and (340). At all slow motion states (332), (336), and (340), the orientation of the device towards gravity will be determined. When a telephone call is received by the handheld, an application event (350) is detected. Similarly, there are two orientation conditions detected, included viewing the visual display (352), and maintaining the handheld in the final position (354). The motion profile depicted in FIG. 3 is as follows: Rest, Motion, Rest, Orientation Face Up, Motion, Rest, Orientation Top Up. From a motion evaluation perspective, the gesture of answering a call received by the handheld is complex as the motion states change at least four times in the sequence.

More specifically, as an incoming telephone call is received, the handheld device can be in any position. During the incoming sequence processing, the user can move the handheld in any way, and the signal processing will identify the gesture as long as two orientation conditions intermitted by motion conditions are met. As the call is received the signal processing to search for a sequence of conditions is started. By using a sequence of orientation conditions of the handheld device, the signal processing generates a fault resilient command absent complex analysis during periods of fast motion. The presence of one or more periods of fast motion serves as confirmation that the sequence is a product of intentional user action(s).

Figure 4:
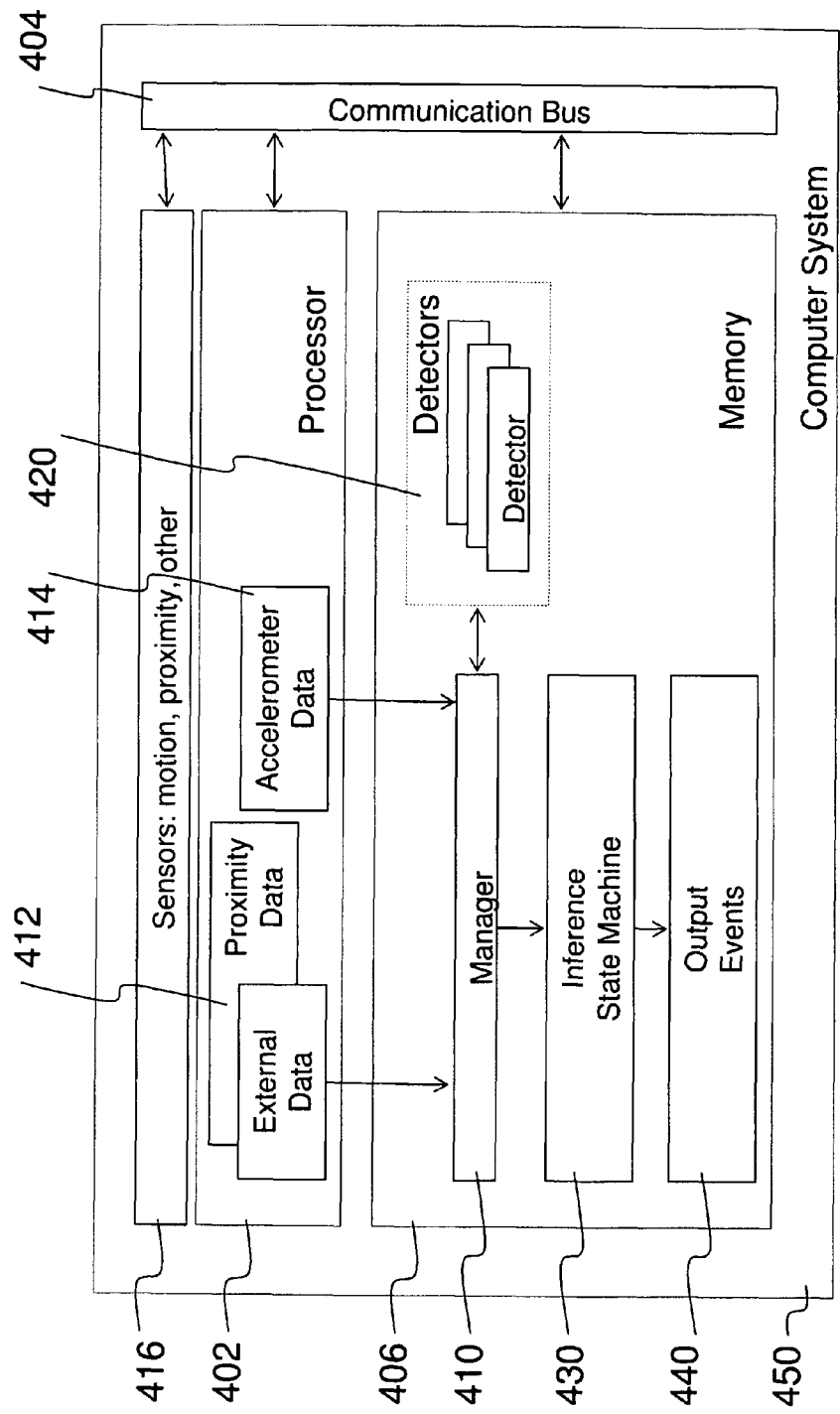
FIG. 4 is a block diagram illustrating employment of one or more proximity sensors in communication with the handheld device.

In one embodiment, a proximity sensor may be employed for processing accelerometer data. FIG. 4 is a block diagram (400) illustrating employment of one or more proximity sensors in communication with the handheld device. As shown, a computer system (450) is provided with a processing unit (402) in communication with memory (406) across a bus (404). Although only one processing unit (402) is shown herein, in one embodiment, the system may be expanded to include multiple processing units. A manager (410) is provided local to memory (406) and in communication with the processing unit (402). The manager (410) functions to control flow of data. More specifically, the manager (410) receives data from multiple sources, including one or more proximity sensor(s) (412) and accelerometer data (414) received from an inertial motion sensor (416). The manager (410) communicates the received data to detectors (420) for processing, and to an inference state machine (430) for inferring an output event. More specifically, the detectors (420) process the data received from the manager (410) and upon completion of the processing returns the processed data to the manager (410). Once the data is received from the detectors (420), the manager (410) forwards the processed data to the inference state machine (430). The inference state machine (430) maintains a sequence of the detected motion and produces a profile description for the detected motion. Based upon matching the profile description, the inference state machine (430) communicates an event (440) that corresponds to the profile description.

The signal processing application may poll the proximity sensor(s) (412) when required. In one embodiment, when a telephone call is received by the handheld device, the signal processing application may poll the proximity sensor(s) (412) at both the second and third rest positions. At the first rest position, the user of the device would be looking at the visual display, and the corresponding proximity sensor signal would communicate that the signal is open, and at the second rest position, the device would be remaining in a listen position and the corresponding proximity sensor signal would communicate that the signal is in a closed position. The motion profile for this scenario is as follows:

| | |
|---|---|
| Application event: | incoming call |
| Motion Profile: | Rest, Motion, Rest (orientation face up, proximity open), Motion, Rest (orientation top up, proximity closed) |

The command for this motion profile is set to an answer of the call for the handheld device. Accordingly, by adding two external conditions to the sequence as received from the proximity sensor(s) reduces the probability of receiving a false positive evaluation of the gestures.

Figure 5:
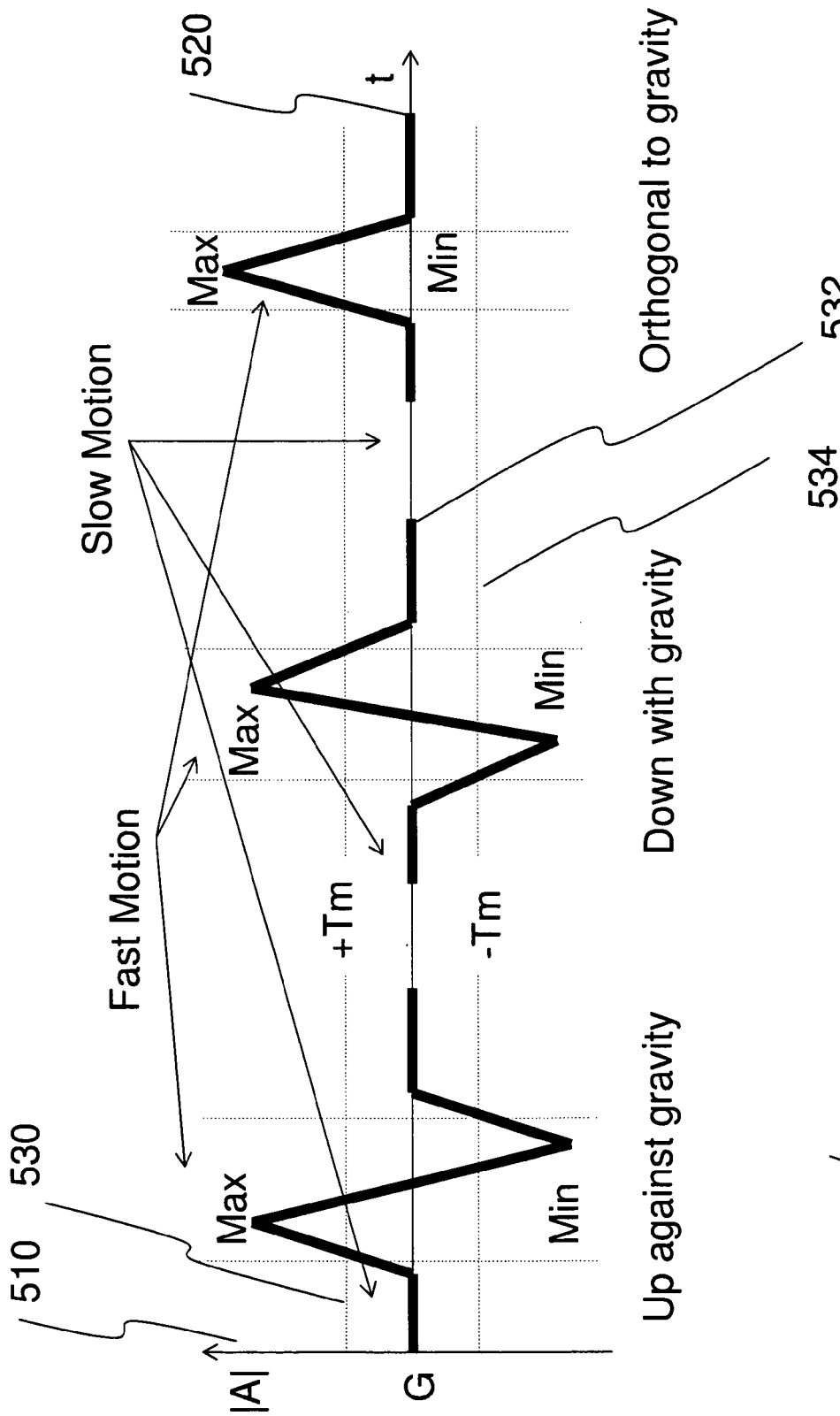
FIG. 5 is a chart illustrating motion pattern of the handheld device pertaining to gravity.

In one embodiment the system may incorporate one or more additional detectors to detect specific sub-conditions associated with fast motion of the handheld device, including a weighing algorithm to detect if the motion is going against gravity, with gravity, or orthogonal to gravity. FIG. 5 is a chart (500) illustrating motion pattern of the handheld device pertaining to gravity. As shown, the vertical axis (510) represents acceleration defined as:

$$|A| = \text{square root}(X^2 + Y^2 + Z^2),$$

where X, Y, and Z are acceleration components measured along x, y, and z axis, respectively and the horizontal axis (520) represents time, t. There are three horizontal lines shown in the chart. The first line (530) represents a positive threshold value with respect to gravity, the second line (532) represents gravity, and the third line (534) represents a negative threshold value with respect to gravity. In one embodiment, the rules for implementing the weighing algorithm are as follows:

if $-Tm < |Amin| < +Tm$, then the motion is substantially orthogonal to gravity if $|Amax|$ is first in time and $|Amin|$ is second in time, then the device is up against gravity if $|Amin|$ is first in time and $|Amax|$ is second in time, then the device is down with gravity Furthermore, in one embodiment, the weighing algorithm may be enhanced by measuring symmetry of $|Amin|$ and $|Amax|$ against gravity as follows:

$$(|Amax| - G)/(G - |Amin|) = Smm,$$

where Smm is the symmetry of the signal spread over gravity. More specifically, symmetry of the signal is approximately one for up and down motion along gravity, and symmetry of the signal is greater than one for motion that is orthogonal to gravity. In one embodiment, use of the symmetry factor enhances resolution of the weighing algorithm.

In a further embodiment, a rotation algorithm is employed to enhance granular sensing of movement of the device. As discussed above, orientation data obtained in a rest position is accurate, as the device is in a stationary position. When the device is subject to motion, the orientation data becomes less accurate. The level of motion can be measured relative to gravity with the use of the following motion detection algorithm:

$$(\text{Sum}(|A_i| : |A_{i+w-1}|)/w - G)/G < T$$

where $A_i$ is a first sample in the window; i is a number of a sample $A_{i+w-1}$ is the last sample in the window, T is a threshold. For example, in one embodiment the value of T may be set at five degree to set the orientation accuracy error to be within five degrees.

Figure 6:
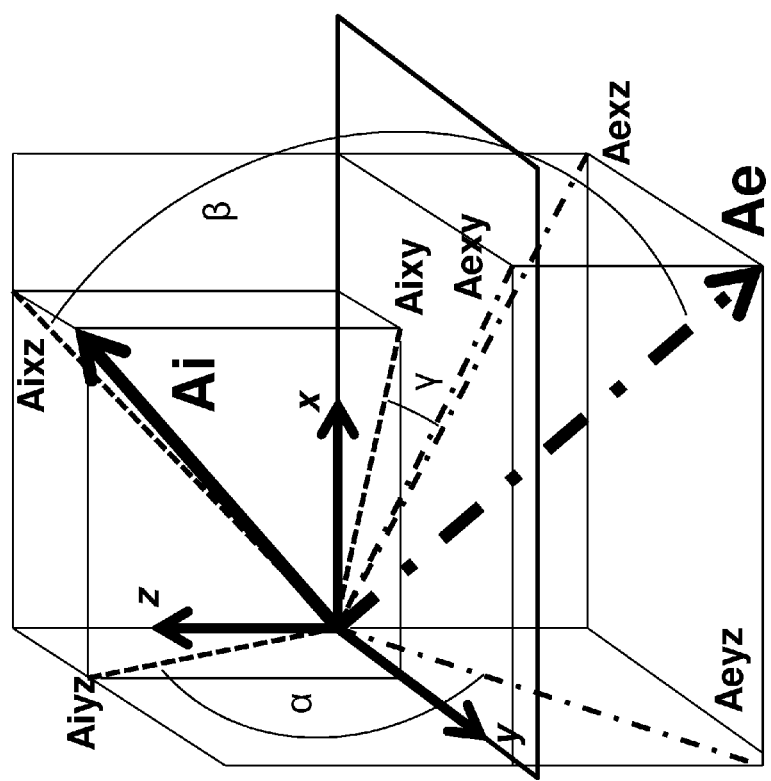
FIG. 6 is an illustration of a vector diagram showing data from an initial acceleration vector position to an ending acceleration vector position.

As described above, acceleration vector data obtained from one or more accelerometers in the device is employed for signal processing. FIG. 6 is an illustration of a vector diagram (600) showing data from an initial acceleration vector position Ai to an ending acceleration vector position Ae. In one embodiment, both Ai and Ae are obtained at two adjacent in time stationary positions. Projections of the acceleration vectors on the YY, XZ, and YZ planes are shown as Aiyy, Aeyy, Aixz, Aexz, Aiyz, and Aeyz. Using the Xi, Yi, Zi components of the initial accelerometer data, and the Xe, Ye, Ze components of the ending accelerometer data, various rotation angles may be computed. For example, roll, pitch, and yaw angles over the X, Y, and Z axes may be computed using the following vector dot product formulas:

$$\alpha = \arccos((YiYe+ZiZe)/\sqrt{((YiYi+ZiZi)(YeYe+ZeZe))})$$

$$\beta = \arccos((XiXe+ZiZe)/\sqrt{((XiXi+ZiZi)(XeXe+ZeZe))})$$

$$\gamma = \arccos((XiXe+YiYe)/\sqrt{((XiXi+YiYi)(XeXe+YeYe))})$$

where $\alpha$ represents the roll angle, $\beta$ represents the pitch angle, and $\gamma$ represents the yaw angle. In one embodiment, the rotation algorithm employed to answer a handheld telephone can compute angles of rotation between two rest positions, as identified in FIG. 3. A rotation condition can be set for this angle to about ninety degrees, which is consistent with moving a handheld telephone from your face to your ear. Accordingly, by setting the rotation condition, the performance of the inference recognition for the fact pattern is enhanced.

When the weighing algorithm determines that the motion is substantially orthogonal to gravity, inference logic can employ an additional algorithm to determine direction of motion relative to a device reference frame and/or an initial position towards gravity. In one embodiment, the additional algorithm may detect a prevailing X, Y, Z component of a motion vector. Similarly, in another embodiment, the additional algorithm may compute angle between orientation at rest and motion vector, or between projections on physical device planes or virtual ones. For example, if the interference logic has detected that a motion is a start-stop motion providing a maximum acceleration value, Amax, and a minimum acceleration value, Amin, are obtained. In addition, two motion vectors may be employed, including a motion vector for a rest position, Arest, and a motion vector for the maximum acceleration value, Amax. Taking the motion vector at rest Arest(Xr, Yr, Zr) and the motion vector at maximum acceleration Amax(Xmax, Ymax, Zmax), a differential motion vector can be employed to compute the angle between the full three dimensional vectors, as well as various angles between their projections. In one embodiment, these angles are direction angles of accelerating force. Similarly, in one embodiment, the angle between the motion vectors at two different rests positions can be computed.

The angle between an orientation vector Ar (Xr, Yr, Zr) and a motion vector Amax (Xmax, Ymax, Zmax), can be calculated as a vector dot product between Ar and Amx as follows:

$$\delta = \arccos((Ar \cdot Amax)/(|Ar||Amax|))$$

Similarly, in one embodiment, the angle between the orientation vector and the motion vector is used to computer directional angle between a motion vector and an accelerometer reference frame, wherein the angles are computed as follows:

computed. For example, roll, pitch, and yaw angles over the X, Y, and Z axes may be computed using the following vector dot product formulas:

$$\alpha_x = \arccos(Xmax/\sqrt{(Xmax^2+Ymax^2+Zmax^2)})$$

$$\alpha_y = \arccos(Ymax/\sqrt{(Xmax^2+Ymax^2+Zmax^2)})$$

$$\alpha_z = \arccos(Zmax/\sqrt{(Xmax^2+Ymax^2+Zmax^2)})$$

Figure 7:
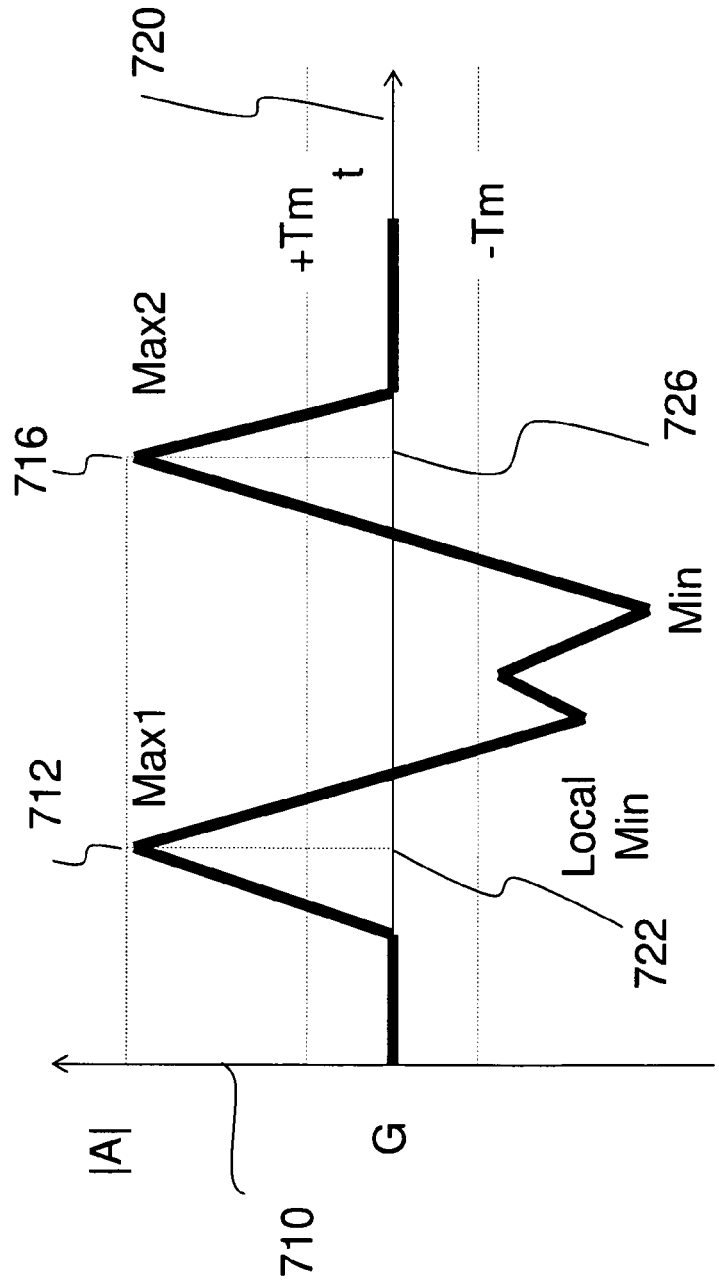
FIG. 7 is a graphical representation of a motion pattern of a handheld device.

Not all motion sequences are predictable for a handheld device. It is known that motion can follow a back and forth pattern with a stop in the middle, wherein the stop happens fast and is difficult to be detected and classified as a legitimate rest condition by the motion detection algorithm. FIG. 7 is a graphical representation (700) of such a motion pattern of a handheld device. As shown, acceleration (710) is represented on the vertical axis, and time (720) is represented on the horizontal axis. In one embodiment, the axis representation may be inverted, and as such, the invention should not be limited to the representation shown herein. There is a first maximum detected acceleration value (712) at time (722) and a second maximum detected acceleration value (716) at time (726). Accordingly, a simple forth-and-back detection condition can be formulated as follows: a maximum acceleration followed by a minimum acceleration and then followed by another maximum acceleration.

Figure 8:
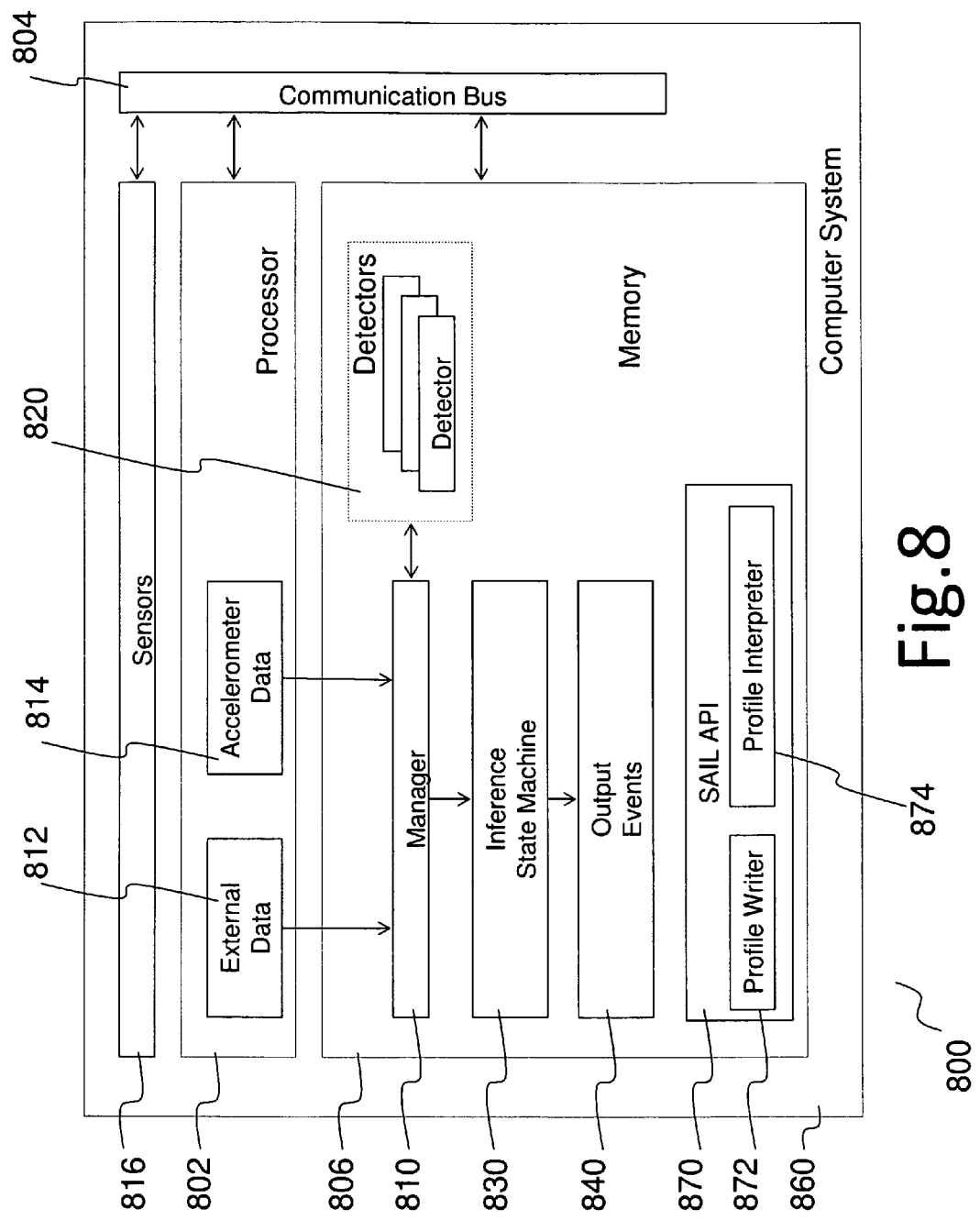
FIG. 8 is a block diagram of the system architecture showing a minimum quantity of components to support the motion based input system to output an event corresponding to a profile description together with an application programming interface.

Complex motion signal processing is replaced by monitoring for a defined set of motion conditions. A profile of a motion is written in terms of motion condition primitives. The motion pattern may be matched to the profile through inference logic when the match occurs. FIG. 8 is a block diagram (800) of the system architecture showing a minimum quantity of components to support the motion based input system to output an event corresponding to a profile description together with an application programming interface. A computer system (860), hereinafter referred to as a system, is provided with a processing unit (802) in communication with memory (806) and sensors (816) across a bus (804). Although only one processing unit (802) is shown herein, in one embodiment, the system may be expanded to include multiple processing units. A manager (810) is provided local to memory (806) and in communication with the processing unit (802). The manager (810) functions to control motion detection components. More specifically, the manager (810) receives data from two sources, including external data (812) received from one or more client applications, the operating system and one or more non-motion sensors, and accelerometer data (814) received from one or more inertial motion sensors (not shown). The manager (810) communicates the received data to an application detector (820), hereinafter referred to as a detector, for processing, and once process, the manager (810) communicates the processed data to an inference state machine (830). More specifically, the detector (820) processes the data received from the manager (810) and upon completion of the processing returns the processed data to the manager (810). Once the data is received from the detector (820), the manager (810) forwards the processed data to the inference state machine (830). The inference state machine (830) maintains a sequence of the detected motion conditions and produces a profile description for the detected motion. Based upon matching the profile description, the inference state machine (830) communicates an event (840) that corresponds to the profile description.

As noted above, an application programming interface (870) is provided in communication with the system (860). The application programming interface (870) includes a profile writer (872) and a profile interpreter (874). The profile writer (872) supports creation of motion profiles for use by the inference state machine (830), and the profile interpreter (874) supports parsing the written profile into the inference state machine (830). In one embodiment, the profile writer contains one or more templates to facilitate integration of motion into an end user application. Accordingly, application programming interface (870) functions as a tool to enhance the profiling abilities of the inference state machine.

Figure 9:
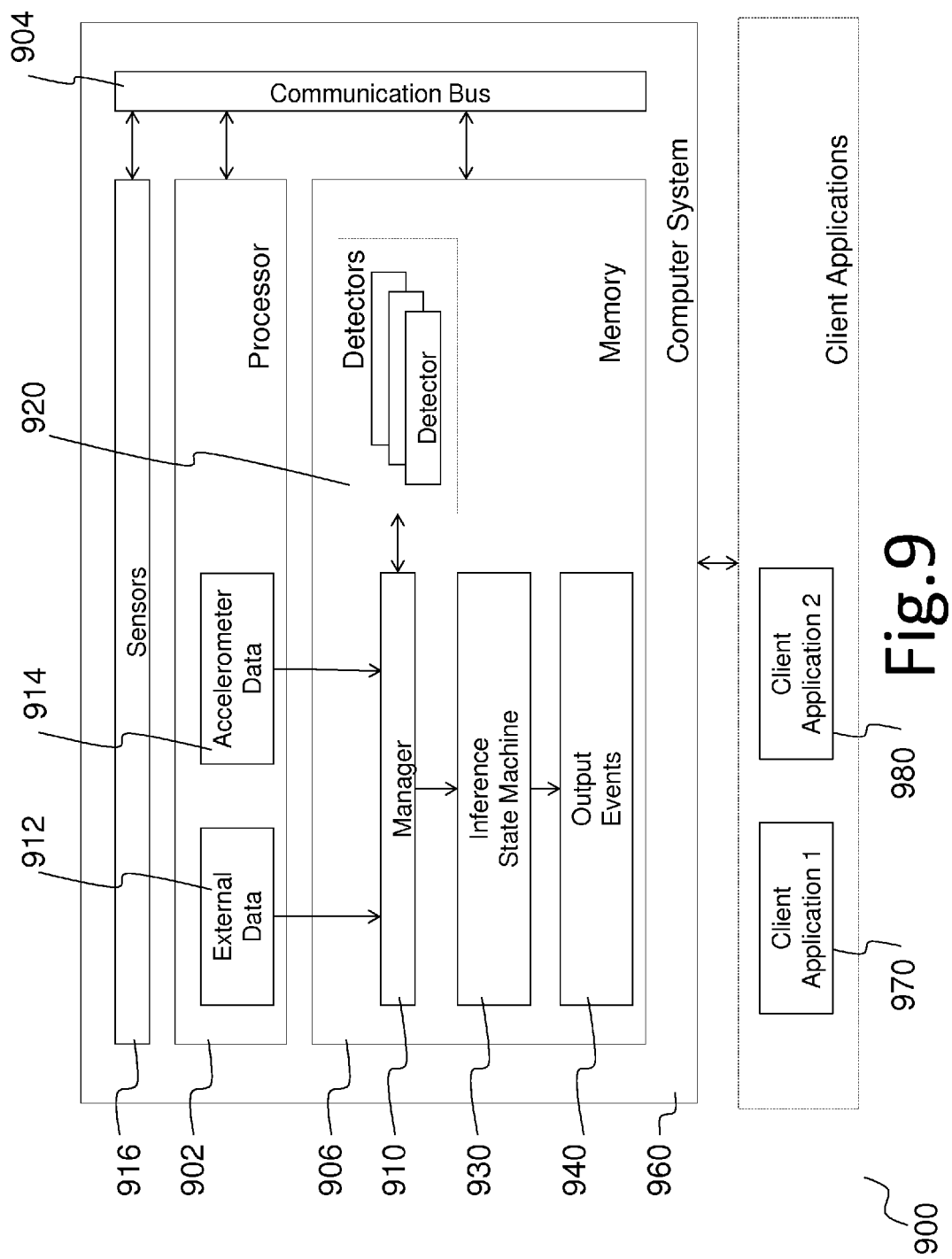
FIG. 9 is a block diagram of the system architecture showing multiple client applications to support the motion based input system to output an event corresponding to a profile description together with an application programming interface, wherein the system support simultaneous running applications.

The inference state machine described above may be employed to provide a motion command for a single application, or may be expanded to provide motion for multiple applications running in a simultaneous manner. FIG. 9 is a block diagram (900) of the system architecture showing multiple client applications to support the motion based input system to output an event corresponding to a profile description together with an application programming interface, wherein the system support simultaneous running applications. A computer system (960) is provided with a processing unit (902) in communication with memory (906) across a bus (904). Although only one processing unit (902) is shown herein, in one embodiment, the system may be expanded to include multiple processing units. A manager (910) is provided local to memory (906) and in communication with the processing unit (902). The manager (910) functions to control motion detection components. More specifically, the manager (910) receives data from two sources, including external data (912) received from one or more client applications, the operating system and one or more non-motion sensors, and accelerometer data (914) received from one or more inertial motion sensors (916). The manager (910) communicates the received data to an application detector (920), hereinafter referred to as detector, for processing, and once process, the manager (910) communicates the processed data to an inference state machine (930). More specifically, the detector (920) processes the data received from the manager (910) and upon completion of the processing returns the processed data to the manager (910). Once the data is received from the detector (920), the manager (910) forwards the processed data to the inference state machine (930). The inference state machine (930) maintains a sequence of the detected motion conditions and produces a profile description for the detected motion. Based upon matching the profile description, the inference state machine (930) communicates an event (940) that corresponds to the profile description.

As noted above, at least two client applications (970) and (980) are provided in communication with the system (960). Each of the application (970) and (980) supports different motion and gesture functionality of the handheld device. For example, in one embodiment, client application (970) may support the functionality of a pedometer and client application (980) may support the functionality of answering a received call. In one embodiment, other functionality may be supported by the client applications, or additional client applications may be provided to support additional functionality. As such, the embodiments of the client applications described herein are merely exemplary and are not considered limiting. Specific rules are employed to manage external events associated with each of the client applications (970) and (980). For example, with respect to client application (970) this can be initiated by activating a key or visual display. The activation will then send a corresponding application event to the inference state machine (930) to start step counting and distance calculation. Step detection will employ a weighing algorithm which differentiates steps up from steps down so that they can be separately counted. Similarly, with respect to client application (980) running simultaneously with client application (970), an incoming call will present an external event which will send an output event to client application (970) to cease step counting and for the second application (980) to seek a call answering gesture. Once the incoming call is disconnected, an event is communicated to the first application (970) to resume step counting. Accordingly, two or more applications may run simultaneously to support gesture and motion detection while mitigating complex mathematical processing.

Alternative Embodiments

It will be appreciated that, although specific embodiments of the invention have been described herein for purposes of illustration, various modifications may be made without departing from the spirit and scope of the invention. In particular, the sensor data may be acquired from one or more sensors present in a portable computing, or one or more sensors placed in the device. For example, along with a proximity sensor it is possible to use a pressure sensor to use a change in atmospheric pressure to disambiguate motion up and down along gravity or a magnetic sensor to enhance orientation at rest and/or slow motion conditions. Similarly, in one embodiment the system may incorporate one or more additional detectors to detect specific sub-conditions associated with fast motion of the handheld device, including a weighing algorithm to detect if the motion is going against gravity, with gravity, or orthogonal to gravity. Accordingly, the scope of protection of this invention is limited only by the following claims and their equivalents.

We claim:

1. A motion based input system comprising:
a processor in communication with a memory;
a motion sensor in communication with the processor;
the processor to acquire movement data from the motion sensor;
a manager configured to execute on the processor and to control motion and orientation detectors, including:
a motion detector to detect motion, including identification of a fast motion phase and a slow motion phase, wherein the motion is classified as slow and fast based upon comparing a magnitude of a motion vector with a magnitude of gravity; and
an orientation detector to detect orientation towards gravity for each slow motion phase; and
an inference state machine in communication with the manager configured to: maintain a sequence of the detected orientations towards gravity, each orientation in the sequence being limited to a slow motion phase;
produce a profile description for the sequence of the detected orientations; and
output an event corresponding to the profile description.

2. The system of claim 1, wherein the detectors and the manager are configured to receive data from at least one client application and use this data to interpret the profile, wherein the profile descriptions are bound with external data from the at least one client application.

3. The system of claim 1, further comprising instructions to detect orientation change for adjacent motion phases selected from the group consisting of: a rest and a defined slow motion phase.

4. The system of claim 1, further comprising instructions to avoid detecting orientation during a fast motion condition.

5. The system of claim 1 wherein the fast motion phase detected by the motion detector is classified as one selected from the group consisting of: motion up against gravity, motion down with gravity, and motion orthogonal to gravity, said classified fast motion phase added to the profile.

6. The system of claim 1, wherein the motion condition detection by the motion detector detects direction of motion when the motion is orthogonal to gravity.

7. The system of claim 1, wherein the fast motion detection by the motion detector includes instructions to compute and add to the profile a rotation angle required to transfer from a first motion phase to a second motion phase based on orientation at the first and second motion phases, the first and second motion phases selected from the group consisting of: slow motion and rest.

8. The system of claim 1, wherein the motion condition detection by the detector includes instructions selected from the group consisting of: detecting start and stop motion, and detecting back-and-forth motion.

9. The system of claim 1, further comprising the detector and the manager to poll data from non-motion sensors, to fuse the polled data with motion data, and add the data to the profile.

10. The system of claim 1, wherein the orientations detected by the orientation detector are classified in terms corresponding to a particular part of a host device being up or down.

11. the system of claim 1, wherein the profile is configured as a sequence of orientations detected at slow motion phases separated by fast motion phases.

12. An article for processing motion data, comprising:
a processor in communication with memory; a motion sensor in communication with the processor;
the processor to acquire movement data from the motion sensor;
a computer readable storage device including computer program instructions configured to detect a motion condition and an orientation condition, the instructions comprising:
instructions to detect motion, including identification of a fast motion phase and a slow motion phase;
instructions to detect orientation towards gravity for each slow motion phase and absent detecting orientation towards gravity during fast motion phases, wherein the motion is classified as slow and fast based upon comparing a magnitude of a motion vector with a magnitude of gravity;
instructions to maintain a sequence of the detected orientations, each orientation towards gravity in the sequence being limited to a slow motion phase;
instructions to produce a profile description for the sequence of the detected orientations; and
instructions to output an event corresponding to the profile description.

13. The article of claim 12, further comprising instructions to receive data from at least one client application and use this data to interpret the profile, wherein the profile descriptions are bound with external data from the at least one client application.

14. The article of claim 12, further comprising the instructions to detect orientation change for adjacent motions selected from the group consisting of: a rest and a defined slow motion condition.

15. The article of claim 12, further comprising instructions to avoid detecting orientation during a fast motion condition.

16. The article of claim 12 wherein the instructions to detect motion include a motion condition classification selected from the group consisting of: motion up against gravity, motion down with gravity, and motion orthogonal to gravity.

17. The article of claim 12, wherein the instructions to detect motion condition includes direction detection of motion when the motion is orthogonal to gravity.

18. The article of claim 12, wherein the instructions to detect motion condition compute and add to the profile a rotation angle required to transfer from a first motion phase to a second motion phase based on orientation at the first and second motion phases, the first and second motion phases selected from the group consisting of: slow motion and rest.

19. The article of claim 12, wherein the instructions to detect motion condition include instructions selected from the group consisting of: detecting start and stop motion, and detecting back-and-forth motion.

20. The article of claim 12, further comprising instructions to poll data from non-motion sensors and to fuse the polled data with motion data.

* * * * *